Sept. 21, 1937.        I. WILLIAMS        2,093,501
ELECTRICAL CONDUCTOR
Filed March 10, 1934
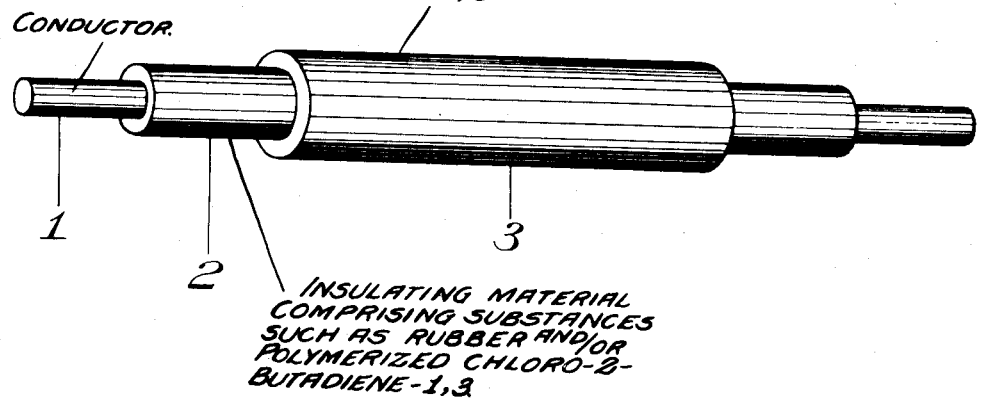
Ira Williams INVENTOR.
BY [signature]
ATTORNEY.

Patented Sept. 21, 1937                                              2,093,501

UNITED STATES PATENT OFFICE

2,093,501

ELECTRICAL CONDUCTOR

Ira Williams, Woodstown, N. J., assignor to E. I. du Pont de Nemours & Company, Wilmington, Del., a corporation of Delaware Application March 10, 1934, Serial No. 715,005

14 Claims. (Cl. 173—264)

This invention relates to electrical conductors. More particularly it relates to insulated wires. Still more particularly it relates to compositions for covering such wires.

This application is a continuation-in-part of copending application, Serial No. 519,244, filed February 28, 1931, which has now matured into Patent No. 1,950,436, dated March 13, 1934, in which it is disclosed that a new product may be obtained by partially polymerizing chloro-2-butadiene-1,3 and then removing the volatile material.

It is an object of this invention to provide new electrical conductors. A further object is to provide a new composition for covering wires to be used as electrical conductors. A still further object is to provide a composition for covering electrical conductors which has improved oil and grease resisting properties. A still further object is to provide a covering material to be used outside ordinary rubber insulation on electrical conductors. Other objects will appear hereinafter.

It has been shown, in the copending application, of which this application is a continuation-in-part, that compositions comprising substantial amounts of chloro-2-butadiene-1,3 polymer and containing the necessary compounding ingredients have insulating properties and are very useful as covering compositions for electrical conductors. Particularly good insulation and resistance to oil and grease are obtained when such compositions are coated over the rubber insulating material ordinarily used on electrical conductors.

In order that the invention may be better understood, reference is made to the accompanying drawing which represents an electrical conductor 1, coated with a cured composition 2, which may be either a rubber composition, a chloro-2-butadiene-1,3 polymer composition or a composition comprising both the natural and the synthetic rubber. The outer coating 3 is a composition comprising a chloro-2-butadiene-1,3 polymer.

As is more particularly pointed out, hereinafter, the inner coating 2 may be dispensed with and the conductor may be covered with a sufficient thickness of a chloro-2-butadiene-1,3 polymer composition. Although the drawing shows a round conductor, it will be understood that the invention is not limited to this particular physical form of conductor but may be applied to any conductor which requires somewhat flexible, solid insulation.

The following examples are intended to be construed as illustrative only and not as limiting the scope of the invention.

Example 1

A compound which consisted of

|   | Lbs. |
|---|---|
| Chloro-2-butadiene-1,3 plastic polymer | 10.0 |
| Zinc oxide | 7. |
| Clay | 14. |
| Mineral oil | 0.5 |
| Paraffin | 0.2 |
| Pine tar | 0.3 |
| Phenyl beta naphthylamine | .15 | was prepared by the usual milling operation.

This compound was forced through a tubing machine to form the insulation for #16 gauge copper wire. The insulated wire was coiled in circular pans and buried in soapstone in the manner usually employed with wire insulated with natural rubber. The pan containing the soapstone and insulated wire was then heated in open steam at 135° C. The resulting product resembled insulated wire prepared with natural rubber.

In a manner similar to that described in Example 1, wire was coated with compositions of the following formulae, in which the parts are given by weight.

| Examples | 2 | 3 | 4 | 5 | 6 | 7 |
|---|---|---|---|---|---|---|
| Chloro-2-butadiene-1,3 plastic polymer | 36.0 | 60.0 | 40.0 | 40.0 | 65.0 | 100.0 |
| Magnesium oxide | 3.6 | 6.0 | 4.0 | 4.0 | 6.0 | |
| Zinc oxide | 3.6 | 4.0 | 3.0 | 4.0 | 6.0 | 10.0 |
| Sulfur | 0.2 | | | 0.5 | 1.0 | 1.0 |
| Litharge | | | | | | 20.0 |
| Wood rosin | 1.8 | 3.0 | 2.0 | 3.0 | 3.0 | 5.0 |
| Whiting | 48.0 | | 27.75 | 20.0 | | |
| Paraffin | 0.3 | | | | | |
| Phenyl-a-naphthylamine | 0.2 | 0.5 | 0.25 | 1.0 | 1.0 | 1.0 |
| Channel carbon black—soft | | 21.5 | 20.0 | | 16.0 | 35.0 |
| Carbon black—channel | | | | 15.0 | | |
| Pine tar | | 5.0 | 3.0 | | | |
| Cottonseed oil | | | | 2.0 | 2.0 | 5.0 |
| *Brown factice | | | | 8.0 | 10.0 | |

(*Made by treating vegetable oils with sulfur at elevated temperatures.)

Compositions 3 and 4 were found to be particularly adapted for abrasion and oil resistant coatings and 5 was designed for secondary network cable.

Example 8

No. 14 copper wire was covered with a layer of insulating material, prepared by mixing the following ingredients on a rubber mill:

| | Parts by weight |
|---|---|
| Smoked sheets | 6.0 |
| Tire reclaim | 35.0 |
| Mineral rubber | 12.0 |
| Whiting | 22.0 |
| Mineral oil | 3.0 |
| Stearic acid | 0.5 |
| Zinc oxide | 2.0 |
| Sulfur | 1.1 |
| Diphenyl guanidine | 0.3 |

This was then covered by extruding around it a layer of the following composition, prepared in the same manner:

| | Parts by weight |
|---|---|
| Chloro-2-butadiene-1,3 plastic polymer | 30.0 |
| Magnesium oxide | 3.0 |
| Zinc oxide | 3.0 |
| Wood rosin | 1.5 |
| Paraffin | .5 |
| Phenyl-a-naphthylamine | .3 |
| Carbon black | 10.0 |
| *Brown factice | 3.0 |

(*Made by treating vegetable oils with sulfur at elevated temperatures.)

This resulting product was then cured by covering it in soapstone and heating for 75 minutes at 45 lbs. steam pressure.

The compositions of the present invention, as indicated in the examples, may be used alone as a wire coating. Preferably, however, the wire will be coated first with a layer of ordinary rubber insulating material and then with a layer of one of the compositions of the present invention.

As is well known, rubber coating compositions have excellent insulating properties. Their resistance to oil, grease, ozone and water, however, is rather low, whereas the resistance of the compositions, described herein, to such agents is quite high. By first coating the wire with an ordinary rubber coating composition and then coating over that a layer of a composition, comprising for example, chloro-2-butadiene-1,3 polymer, the insulating properties of the rubber composition are retained in the final product and, in addition, the covering of the wire is highly resistant to the agents listed above which are particularly destructive to the rubber. Moreover, although the combination is somewhat more expensive than a rubber covering, it is substantially less expensive than a coating made entirely from a chloro-butadiene composition.

The compositions of the present invention may also be varied by replacing a portion, large or small, of the chloro-2-butadiene-1,3 polymer with natural rubber. The rubber and chlorobutadiene may be milled with the usual rubber compounding ingredients in the manner described in the examples.

Thus, by way of illustration, the following example is given:

Example 9

A composition, which consisted of:

| | Lbs. |
|---|---|
| Chloro-2-butadiene-1,3 plastic polymer | 50 |
| Rubber | 50 |
| Zinc oxide | 10 |
| Litharge | 20 |
| Wood rosin | 1.5 |
| Phenyl-a-naphthylamine | 1 |
| Sulfur | 1.5 |
| Carbon black—channel | 35 |
| Cottonseed oil | 2 |
| *Antioxidant | 0.5 |
| †Accelerator | 0.5 |
| Pine tar | 2 |

(*This antioxidant was a condensation product of one mol of butyraldehyde with one mol of aniline.)
(†This accelerator was a condensation product of a plurality of mols of butyraldehyde with one mol of aniline.)

was prepared by the usual milling operation.

Copper wire was then covered with this composition and cured by covering in soapstone and heating for 75 minutes at 45 pounds steam pressure.

Compositions of this type retain to a surprising degree the desirable properties of both the rubber and the chloro-butadiene. They are good insulators and at the same time they are much more resistant to oil, grease, ozone and water, than are natural rubber compositions.

While this invention has been thus far described with reference to chloro-2-butadiene-1,3 polymer, it is not intended to be so limited. In preparing the wire covering compositions which are the subject of this invention, any of the plastic polymers of the hydro-halogen addition products of monovinylacetylene may be substituted for the chloro-2-butadiene-1,3 polymer. As is apparent, however, from the description, the chloro-2-butadiene-1,3 polymer compositions are to be preferred.

It is apparent the proportions of the various materials to be used in these wire covering compositions may vary within very wide limits. In general the composition should contain an appreciable amount of a metallic oxide. As disclosed in a copending application of Bridgewater, Serial No. 715,004, filed March 10, 1934, compositions containing, in addition to the chlorobutadiene polymer, an oxygen, sulfur or nitrogen containing resinous or plastic material, have a particularly high oil and grease resistance. Such resinous or plastic materials include, for example, alkyd resins, synthetic resins produced by polymerizing vegetable oils, synthetic resins produced by treating vegetable oils with sulfur at elevated temperatures, synthetic resins produced by treating vegetable oils with sulfur chloride at elevated temperatures, protein materials and various oil-resistant natural gums and resins.

Mineral fillers, such as clay, carbon black, whiting, etc., may be added as desired. Sulfur may be used or eliminated as desired. Accelerators may be used to decrease the period of curing and antioxidants, such as phenyl-alpha-naphthylamine are desirable to retard deterioration. In general, the ordinary rubber compounding ingredients may be used in preparing the compositions of the present invention. The wires may be coated either in an ordinary tubing machine or by wrapping with tape.

As has already been pointed out, wires covered with these compositions show a greatly improved resistance to oil and grease and to abrasive materials. Moreover, they are highly resistant to many of the common organic solvents. In addition, they are particularly resistant to the so-called corona effect, that is, cracking of the insulation under high voltage currents, such as are used for neon lamps and automobile ignition cables.

It will be apparent that these compositions will not only be more effective when used in place of compositions heretofore known but in addition, their new properties will permit them to be used under conditions where known compositions would fail.

It is apparent that many widely different embodiments of this invention may be made without departing from the spirit and scope thereof and therefore, it is not intended to be limited except as indicated in the appended claims.

I claim:

1. An electrical conductor covered with a composition comprising a polymer of a hydro-halogen addition product of monovinylacetylene.

2. An electrical conductor covered with a composition comprising a polymer of chloro-2-butadiene-1,3.

3. An electrical conductor covered with a cured composition comprising a polymer of chloro-2-butadiene-1,3 and a member of the class consisting of alkyd resins, synthetic resins produced by polymerizing vegetable oils, synthetic resins produced by treating vegetable oils with sulfur at elevated temperatures, and synthetic resins made by treating vegetable oils with sulfur chloride at elevated temperatures.

4. An electrical conductor covered with a composition comprising natural rubber and a polymer of a hydro-halogen addition product of monovinylacetylene.

5. An electrical conductor covered with a composition comprising natural rubber and chloro-2-butadiene-1,3 polymer.

6. An electrical conductor covered with a composition comprising chloro-2-butadiene-1,3 polymer and brown factice.

7. An electrical conductor covered with at least two layers of insulating material, the outer layer being a composition containing a polymer of a hydro-halogen addition product of monovinylacetylene.

8. An electrical conductor covered with at least two layers of insulating material, the outer layer being a composition containing chloro-2-butadiene-1,3 polymer.

9. An electrical conductor covered with at least two layers of insulating material of differing composition, the outer layer being a composition containing a polymer of a hydro-halogen addition product of monovinylacetylene.

10. An electrical conductor covered with at least two layers of insulating material of differing composition, the outer layer being a composition containing chloro-2-butadiene-1,3 polymer.

11. An electrical conductor covered with at least two layers of insulating material of differing composition, the inner layer being a composition comprising natural rubber and the outer layer being a composition comprising chloro-2-butadiene-1,3 polymer.

12. An electrical conductor having as an outer layer of insulation a cured chloro-2-butadiene-1,3 polymer composition.

13. An electrical conductor having as an outer layer of insulation a cured chloro-2-butadiene-1,3 polymer-rubber composition.

14. An electrical conductor covered with an inner layer of a cured rubber composition and an outer layer of a cured chloro-2-butadiene-1,3 polymer composition.

IRA WILLIAMS.